(12) United States Patent
Grosskopf et al.

(10) Patent No.: US 11,384,808 B2
(45) Date of Patent: Jul. 12, 2022

(54) WRAP SPRING AND WRAP SPRING ASSEMBLY

(71) Applicant: WABCO EUROPE BVBA, Brussels (BE)

(72) Inventors: Ralf Grosskopf, Lobach (DE); Eugen Kloos, Viernheim (DE)

(73) Assignee: WABCO Europe BVBA, Brussels (BE)

( * ) Notice: Subject to any disclaimer, the term of this patent is extended or adjusted under 35 U.S.C. 154(b) by 208 days.

(21) Appl. No.: 16/648,992

(22) PCT Filed: Sep. 21, 2017

(86) PCT No.: PCT/EP2017/001121
§ 371 (c)(1),
(2) Date: Mar. 19, 2020

(87) PCT Pub. No.: WO2019/057264
PCT Pub. Date: Mar. 28, 2019

(65) Prior Publication Data
US 2020/0217380 A1    Jul. 9, 2020

(51) Int. Cl.
*F16D 65/56* (2006.01)
*F16F 1/04* (2006.01)
(Continued)

(52) U.S. Cl.
CPC ............ *F16D 65/567* (2013.01); *F16F 1/042* (2013.01); *F16F 1/06* (2013.01); *F16F 1/12* (2013.01); *F16D 55/225* (2013.01)

(58) Field of Classification Search
CPC ........ F16D 65/567; F16D 65/56; F16D 65/66; F16D 55/225; F16F 1/042; F16F 1/06; F16F 1/12
See application file for complete search history.

(56) References Cited

U.S. PATENT DOCUMENTS 5,575,460 A * 11/1996 Knopfel ............. A47C 23/0438
                                                    267/101
10,670,097 B2 * 6/2020 Henning ............... F16D 65/567
(Continued)

FOREIGN PATENT DOCUMENTS

DE    102014101341 A1    8/2015
DE    102014218233 A1    3/2016
(Continued)

OTHER PUBLICATIONS

European Patent Office, Rijswijk, Netherlands, International Search Report of International Patent Application No. PCT/EP2017/001121, dated Jun. 21, 2018, 2 pages.
(Continued)

*Primary Examiner* — Thomas W Irvin
(74) *Attorney, Agent, or Firm* — Dickinson Wright PLLC

(57) ABSTRACT

The invention relates to a wrap spring for blocking an unwanted rotational movement of a rotary element. The invention further relates to an adjusting device for adjusting the wear of brake pads of a disk brake. An adjusting device comprises a guide sleeve in which a wrap spring is arranged, a grooved ring which encompasses the guide sleeve, wherein the grooved ring is coupled to a closure cap via a torsion spring, and an opening ring encompassing the grooved ring. The invention further relates to a disk brake for a vehicle, in particular for a utility vehicle, wherein the disk brake comprises an adjusting device with a wrap spring.

14 Claims, 6 Drawing Sheets

(51) Int. Cl.
*F16F 1/06* (2006.01)
*F16F 1/12* (2006.01)
*F16D 55/225* (2006.01)

(56) References Cited

U.S. PATENT DOCUMENTS

| | | | |
|---|---|---|---|
| 2015/0084250 A1* | 3/2015 | Ahn | F16F 1/046 267/142 |
| 2019/0136925 A1* | 5/2019 | Grosskopf | F16D 55/2255 |
| 2020/0224740 A1* | 7/2020 | Grosskopf | F16D 65/52 |

FOREIGN PATENT DOCUMENTS

| | | |
|---|---|---|
| DE | 102014017430 A1 | 5/2016 |
| DE | 102014017438 A1 | 5/2016 |
| DE | 102014019111 A1 | 6/2016 |
| EP | 0614025 A1 | 9/1994 |
| EP | 3051170 A1 | 8/2016 |

OTHER PUBLICATIONS

Anonymous: "Porsche 911/914 Pedal Cluster Rebuild—1965-1989—Pelican Parts DIY Maintenance Article," Sep. 1, 2009 (Sep. 1, 2009), XP055484072, 9 pages, https://www.pelicanparts.com/techarticles/Mult_pedal_cluster/Mult_pedal_cluster.htm.

Anonymous: "90142353100—URO Parts—Porsche Brake Pedal Return Spring—Free Shipping Available," Sep. 1, 2009 (Sep. 1, 2009), XP055484056, 2 pages, https://www.eeuroparts.com/Parts/188597/Brake-Pedal-Return-Spring-APA90142353100.

* cited by examiner

WRAP SPRING AND WRAP SPRING ASSEMBLY

TECHNICAL FIELD

The present disclosure relates to a wrap spring for blocking an unwanted rotational movement of a rotary element. The present disclosure further relates to an adjusting device for adjusting the wear of brake pads of a disk brake. The invention further relates to a disk brake for a vehicle, in particular for a utility vehicle, wherein the disk brake comprises an adjusting device with a wrap spring.

BACKGROUND

Brake application devices having an adjusting device for adjusting the clearance between the brake pad and the brake disk are sufficiently well known. Generally, such disk brakes can be actuated either pneumatically or electromechanically.

In the area of utility vehicles, for example, there are mechanical adjusting devices for utility vehicle disk brakes. The function of brake application devices on disk brakes is to provide a uniform clearance in all driving situations or braking situations, which in turn calls for a highly precise adjustment. In actuation of the brake, the existing clearance until the brake pad bears on the brake disk must be overcome by way of the brake application device. The clearance is a determining factor, for example, in the swiveling range of a turning lever for brake application, and consequently in the maximum braking force to be applied and the reserves of braking force. Should the clearance deviate from a set value during vehicle braking, the adjusting device is actuated. In other words, in the event of a deviation from the set value, i.e. an increase in the clearance due to wearing of the brake pads and/or the brake disk, the brake pads are automatically adjusted by way of the adjusting device. The adjustment may be performed, for example, through an adjusting movement of pistons.

Wrap springs, in turn, are often used as clutches or overrunning clutches. In the area of utility vehicles, wrap springs are used in adjusting devices, particularly in disk brakes. According to DE 10 2014 218 233 A1, wrap spring clutches include a coil spring, which is wound on a shaft or a cylindrical body and attached to the drive at one end. By bringing the ends of the coil spring closer together or moving them apart, it is possible to adjust the frictional resistance between the coil spring and the shaft or the cylindrical body.

DE 10 2014 017 430 A1 sets forth a wear adjustment device for a disk brake, in which the adjusting device comprises a wrap spring which, at least when rotated in a second direction of rotation opposed to the first direction of rotation, meshes with the external thread of the adjusting spindle and screws the adjusting mechanism in relation to the adjusting spindle.

EP 3 051 170 A1 also shows an adjusting device for a disk brake having a rectangular-shaped wrap spring, the wrap spring being arranged around an outer piston and one end of the wrap spring being connected to a drive ring, so that the wrap spring acts as a one-way/overrunning clutch.

In the case of DE 10 2014 101 341 A1, the transmission arrangement of an adjusting device takes the form of a helical wrap spring, in which the adjusting device, along a first helical portion, is supported radially with respect to the drive element and along a second helical portion is supported radially with respect to the adjusting element. The one radial support is situated on the inside of the wrap spring and the second radial support is situated on the outside of the wrap spring.

DE102014019111A1 sets forth an adjusting device having a wrap spring, in which the wrap spring is held torsionally fixed or rotationally restricted in relation to the adjusting spindle and/or the nut part. The wrap spring rests circumferentially against the adjusting spindle and/or the nut part and comprises a multi-coil wire spring.

Another adjusting device is disclosed, for example, in DE10 2014017438 A1. In this, the adjusting device includes a wrap spring having a projecting spring end, which engages in a retaining aperture of the guide sleeve or is looped around a drive flank of the guide sleeve in a circumferential direction. The wrap spring is therefore firmly positioned axially. Between the guide sleeve and the projecting spring end of the wrap spring there is a distance or gap in a circumferential direction, which cannot be compensated for in a wear adjustment of the brake pads.

SUMMARY

The object of the invention is to overcome the disadvantages inherent in the prior art and to provide a wrap spring and an arrangement of the wrap spring on an adjusting device for a disk brake which prevents premature fatigue fracture and provides an acceptable variation in the switching angle or the inoperative angle, that is to say the control state of the adjusting device until the wrap spring is slipping, and an associated acceptable variation in the clearance of a disk brake.

According to the invention the object is achieved in that the wrap spring comprises at least one U-shaped projection. The U-shaped projection of the wrap spring serves, in the fitted state in the adjusting device, as additional radial support, thereby significantly reducing the load acting on the wrap spring. So-called fatigue fractures on the wrap spring are prevented or at least minimized. A fatigue fracture is taken to mean the overloading of the material which occurs in the event of an excessive stress in the material or excessive pressure on the material.

In a further advantageous embodiment, the U-shaped projection is formed from at least one wrap spring coil between a first wrap spring end and a second wrap spring end. The wrap spring is thereby significantly more rigid compared to an embodiment of the U-shaped projection at the first wrap spring end or the second wrap spring end. Bending of the U-shaped projection is moreover not possible or at least distinctly more difficult, so that greater switching angles are prevented. A premature failure of the adjusting device is therefore prevented.

The wrap spring furthermore has an angle $\alpha$, as viewed along a central axis of the wrap spring, between the U-shaped projection and the first wrap spring end, in the circumferential direction of the wrap spring.

In addition, the wrap spring, between the U-shaped projection and the first wrap spring end, extends along, or continues, at an angle $\alpha$ by 90 degrees in the circumferential direction of the wrap spring.

The continuation of the stressed first wrap spring end halves the switching angles. In particular, the continuation of the wrap spring at the angle $\alpha$ prevents a lifting of the clamped end in the adjusting device during the return stroke of the adjusting device.

In a further advantageous embodiment, the wrap spring has a circular cross section or a trapezoidal cross section. Compared to the original shapes, in which the wrap spring is produced from a rectangular wire and is drawn onto a cylindrical circumferential surface, the wrap spring having a circular cross section runs in a thread of the adjusting spindle. By using a wrap spring with a trapezoidal cross section instead of a circular cross section, it is possible to improve the fatigue behavior of the wire from which the wrap spring is produced yet further. One disadvantage of a trapezoidal cross section, however, is that it increases the stiffness of the wrap spring and thereby the sensitivity to tolerances.

According to the invention the object is further achieved in that the wrap spring is arranged with the U-shaped projection on a bead of the intermediate ring. Arranging the wrap spring on the bead of the intermediate ring prevents any play of the wrap spring between the guide sleeve and the intermediate ring. The wrap spring is held without any play, at least in the initial home position of the adjusting device.

In addition, the wrap spring is advantageously arranged in the thread of the adjusting spindle. This increases the precision of the adjustment process, and components such as the circumferential surface, for example, that the adjusting spindle has been drawn onto in prior designs, are no longer necessary.

Moreover, in a further advantageous embodiment the wrap spring, during an adjustment process, is supported in a circumferential direction, opposed to the free-running direction, on a drive flank of the guide sleeve, and turns the adjusting screw. In the return stroke direction, i.e. in the free-running direction of the wrap spring, the intermediate ring provides for positioning of the wrap spring.

In a further advantageous embodiment, a torsional safeguard of a threaded ring, the U-shaped projection of the wrap spring, and a groove of a grooved ring is arranged on a common circumferential side of the adjusting spindle, resulting in a coordinated combination of forces. This serves to reduce the lateral forces and transverse torques acting on the adjusting parts, such as the adjusting screw and inner sleeve of the adjusting device. In addition, the influence exerted by the play in the guide sleeve and the outside diameter of the thread on the clearance is minimized.

A further advantageous embodiment results from arranging the torsional safeguard of the threaded ring, the U-shaped projection of the wrap spring, and the groove of the grooved ring within an angular segment of 0-45 degrees, starting from the wrap spring axis. A displacement of the adjusting spindle in the thread of the thrust piece is largely prevented, so that increased clearances between the brake disk and at least the one brake pad and a greater variation in the clearances are avoided.

Furthermore, in an especially preferred embodiment the torsional safeguard of the threaded ring, the U-shaped projection of the wrap spring, and the groove of the grooved ring are arranged axially one behind the other within an angular segment of between 0 degrees and 0-25 degrees, on a common circumferential side of the adjusting spindle. The lateral forces and transverse torques acting on the adjusting parts, such as the adjusting screw or guide sleeve, are thereby virtually eliminated. The clearance between the guide sleeve and the adjusting spindle ceases to be significant in terms of tolerances.

The wrap spring for adjustment of the wear on brake pads may furthermore be arranged in an adjusting device for a disk brake of a vehicle.

BRIEF DESCRIPTION OF THE DRAWINGS

Selected exemplary embodiments of the invention are explained below, referring to the figures attached, of which.

DETAILED DESCRIPTION OF THE DRAWINGS

Figure 1:
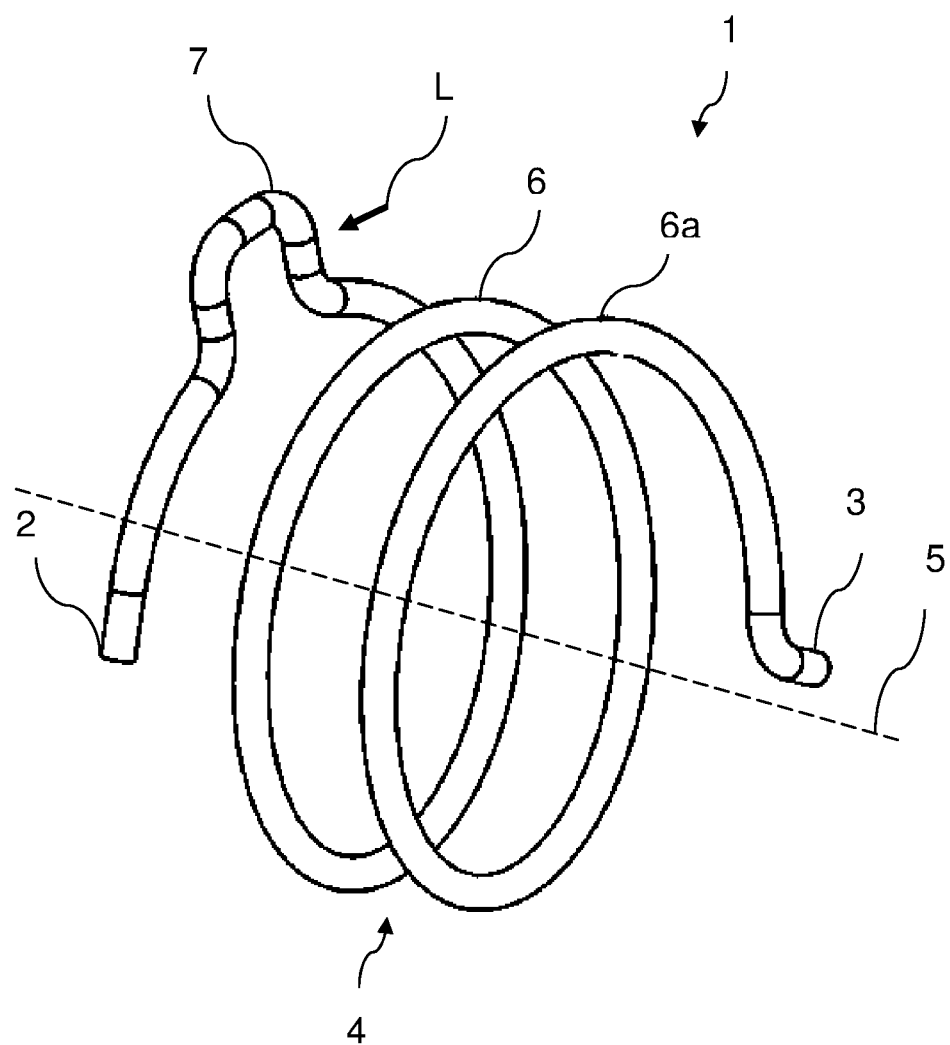
FIG. 1 shows the front view of a wrap spring according to the invention.

A wrap spring 1 according to FIG. 1 has a first wrap spring end 2, a second wrap spring end 3 and a wrap spring portion 4 arranged between the first wrap spring end 2 and the second wrap spring end 3. The wrap spring portion 4 is divided into two wrap spring coils 6, 6a. The first wrap spring end 2 extends along, or is continued by, 90 degrees in a circumferential direction. This serves to halve the switching angle of an adjusting device 10 (not shown in FIG. 1) compared to the prior art. The first wrap spring coil 6 has a U-shaped projection 7. A load L introduced on the U-shaped projection 7 leads to bending moment on the U-shaped projection 7, which is slightly deformed under the load. This causes, on the opposite side of the U-shaped projection 7 to the load L introduced, radial forces which prevent further deformation and limit the bending moment to the side on which the load L is introduced.

Figure 2:
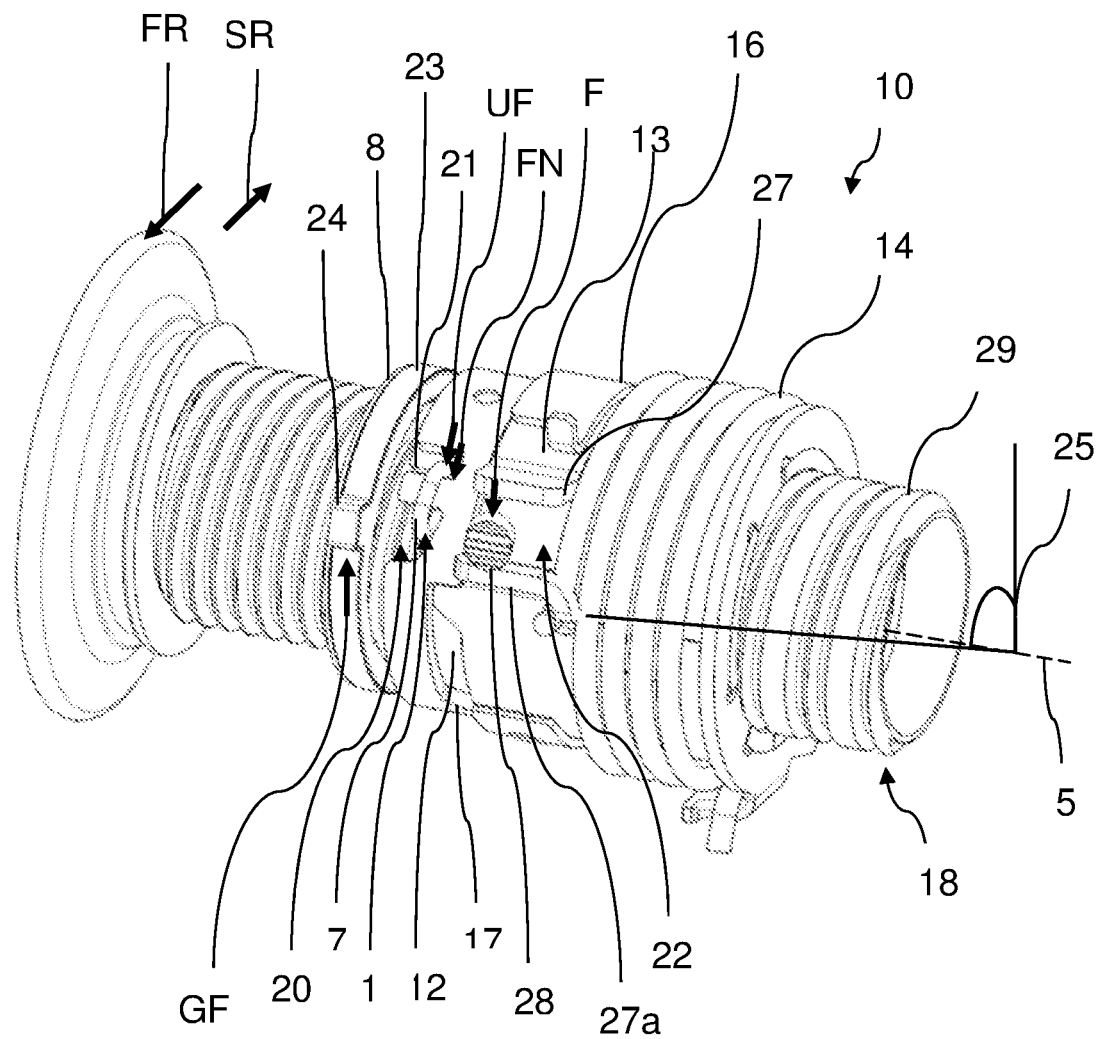
FIG. 2 shows an adjusting device with a fitted wrap spring on an adjusting spindle.

FIG. 2 shows how the wrap spring 1, in the fitted state, is arranged in the adjusting device 10 of a disk brake. The wrap spring 1 is fixed to a guide sleeve 12 by way of the U-shaped projection 7, which is a spring-preloaded suspension, the spring preloading being achieved by a torsion spring 14, via a grooved ring 13 and an intermediate ring 17. The adjusting device 10 further includes a disk spring 8, which axially prestresses a threaded ring 23. The disk spring 8 is arranged between a thrust piece 9 of an adjusting spindle 18 and the threaded ring 23, and under the threaded ring 23. The intermediate ring 17 is then pressed into interlocking engagement with the guide sleeve 12. During the adjustment process the U-shaped projection 7 of the wrap spring 1 is braced against the rigid meshing of the guide sleeve 12 and turns the adjusting spindle 18. In the return stroke direction, the intermediate ring 17 provides for positioning of the wrap spring 1. An opening ring 16 allows the adjusting device 10 to be reset during a brake-pad replacement in so far as the action of the wrap spring 1 in the locking direction SR, counter to a free-running direction FR, is cancelled.

The adjusting device 10 works on the principle of coordinated forces (action and reaction). That is to say a groove 22 of the grooved ring 13, a torsional safeguard 24 of the threaded ring 23, and the suspension of the wrap spring 1 in a bead 20 of the intermediate ring 17 lie one behind the other, on one side of the adjusting device 10, in an angular segment 25 of 0 degrees to 45 degrees. The reference point of the angular segment 25 is the wrap spring axis 5 of the wrap spring 1. When a force F acts on a first groove flank 27 of the grooved ring 13 by way of an adjusting pin 28 of a turning lever (not shown), this force is transmitted directly to the wrap spring 1 by a drive flank 21 of the guide sleeve 12. The grooved ring 13 moreover has a second groove flank 27a. The friction torques in a screw thread 29 of the adjusting spindle 18 and on the threaded ring 23 are identical. The force produced on the torsional safeguard 24 of the threaded ring 23 is therefore approximately 50% of the force F that has been transferred to the U-shaped projection 7 of the wrap spring 1. The torsional safeguard 24 of the threaded ring 23 acts in opposition to a counterforce FN of the torsional safeguard 24 on the U-shaped projection 7 of the wrap spring 1. A circumferential force UF on the wrap spring 1 and a counterforce GF on the torsional safeguard 24 of the threaded ring 23 likewise form a combination of opposed (unequal) forces. This eliminates all "rocking" and the clearance between the guide sleeve 12 and the adjusting spindle 18 ceases to be significant in terms of tolerances. The "rocking" occurs when the adjusting pin 28 of the turning lever drives the grooved ring 13 by way of the groove flanks 27, 27a. The grooved ring 13 then moves initially like a rocker and carries the wrap spring 1 along only once the free travel between the grooved ring 13 and the guide sleeve 12 has been overcome.

If the counterforce GF and the force F on the torsional safeguard 24 and at the point of engagement, i.e. on the groove flanks 27, 27a of the grooved ring 13 of the adjusting pin 28 were equal, this would result in a virtual axis of rotation between the point of engagement of the adjusting pin 28 and the torsional safeguard 24 of the threaded ring 23.

Figure 3:
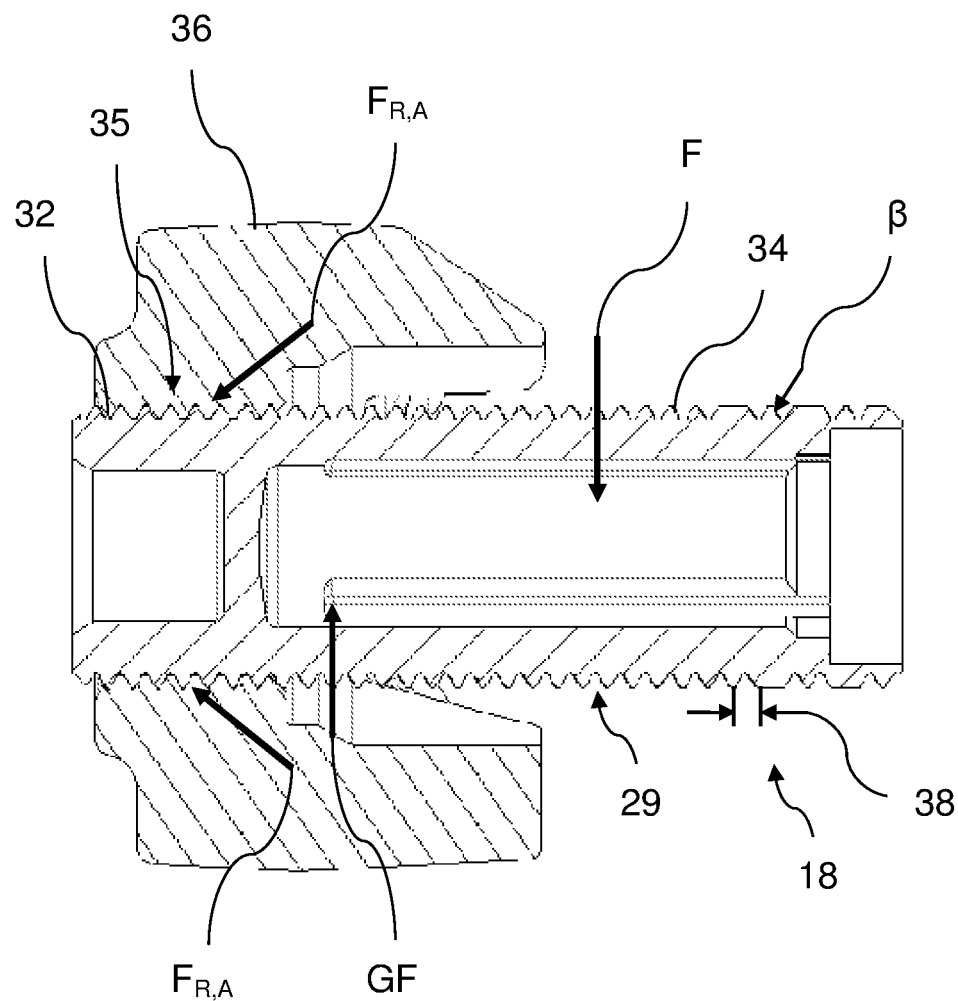
FIG. 3 shows a sectional side view of the adjusting spindle with the flux of forces of the adjusting device.

According to FIG. 3 the counterforce GF on the torsional safeguard 24 according to FIG. 2 and the force F at the point of engagement of the adjusting pin 28 according to FIG. 2 are unequal. The torsional safeguard 24, the adjusting pin 28, the disk spring 8 and the threaded ring 23 are not shown in FIG. 3, for which reason reference is also made to FIG. 2. The instantaneous center thereby migrates into the interior of the adjusting spindle 18. The instantaneous center is taken to mean the instantaneous axis of rotation. In addition, the forces GF, F of the force combination and the first thread turn 32 of the screw thread 29 do not lie axially in one plane. As a result, bending moments are produced about the transverse axis of the adjusting spindle 18. As already described in FIG. 2, the disk spring 8 is axially pre-tensioned. The pre-tensioning force of the disk spring 8 on the threaded ring 23 braces the adjusting spindle 18 against the nut thread 35 of the thrust piece 36. A flank angle β of 60 degrees of the flanks 34 of the screw thread 29 of the adjusting spindle 18 gives rise to axial and radial forces $F_{R,A}$ on the screw thread 29. The flanks 34 of the screw thread 29 moreover have a flank diameter 38, which is described in more detail in FIG. 4. As described in FIG. 2, the first half of the force F on the grooved ring 13 is absorbed by the torsional safeguard 24 of the threaded ring 23. The second half of the force F, which has been transferred to the grooved ring 13, must be absorbed via an imbalance of the forces on the flanks 34 of the screw thread 29.

Figure 4:
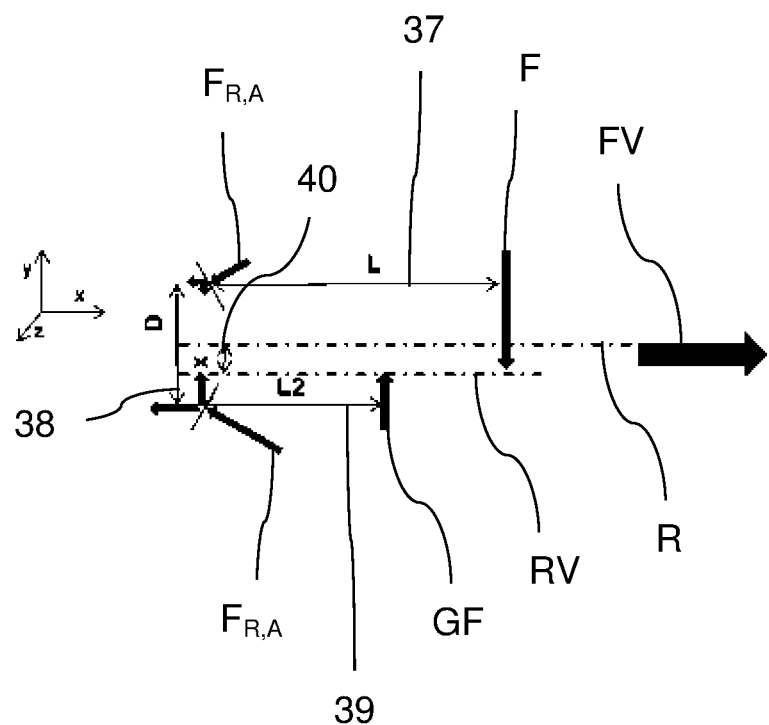
FIG. 4 shows a schematic view of the flux of forces of the adjusting device.

FIG. 4 shows how the second half of the force F is absorbed on the grooved ring 13 according to FIG. 2. FIG. 4 shows a schematic view of the force fluxes. Reference is therefore also made to FIG. 2 and FIG. 3 for a better understanding. The excess torque of the force F on the grooved ring 13 and the counterforce GF on the torsional safeguard 24 of the threaded ring 23 is taken up by a counter-torque from the pre-tensioning force FV of the threaded ring 23, in conjunction with an offset of an axis of rotation R. While a new virtual axis of rotation RV persists within the flanks 34 of the screw thread 29 during the rotation of the adjusting spindle 18, the upper part of the flanks 34 of the screw thread 29 does not lift and the adjusting spindle 18 does not tilt. A tilting of the adjusting spindle 18 would lead immediately to an idle travel on the grooved ring 13. The axis of rotation R and the virtual axis of rotation RV are situated at a distance 40 apart. In addition, the adjusting spindle 18 automatically centers itself in the nut thread 35 of the thrust piece 36 during the rotational movement. This serves to prevent a deflection of the adjusting spindle 18 in a radial direction. The force F on the groove 22 of the grooved ring 13 and the force GF on the torsional safeguard 24 of the threaded ring 23 are directly linked to the pre-tensioning force FV. Furthermore, the grooved ring 13 is stabilized via slight bracing forces to the guide sleeve 12. If the pre-tensioning force FV increases, the force F of the grooved ring 13 and the force GF on the torsional safeguard 24 of the threaded ring 23 also increase.

A further feature shown in FIG. 4 is that the distance 37 of the first thread turn 32 of the screw thread 29 from the introduction of the force F on the grooved ring 13 is between 0 and 1.5 times the flank diameter 38 of the screw thread 29. Furthermore, the distance 39 of the first thread turn 32 of the screw thread 29 from the torsional safeguard 24 of the threaded ring 23 is likewise between 0 and 1.5 times the flank diameter 38 of the screw thread 29. Those of the axial and radial forces $F_{R,A}$ are moreover shown in FIG. 4.

Figure 5:
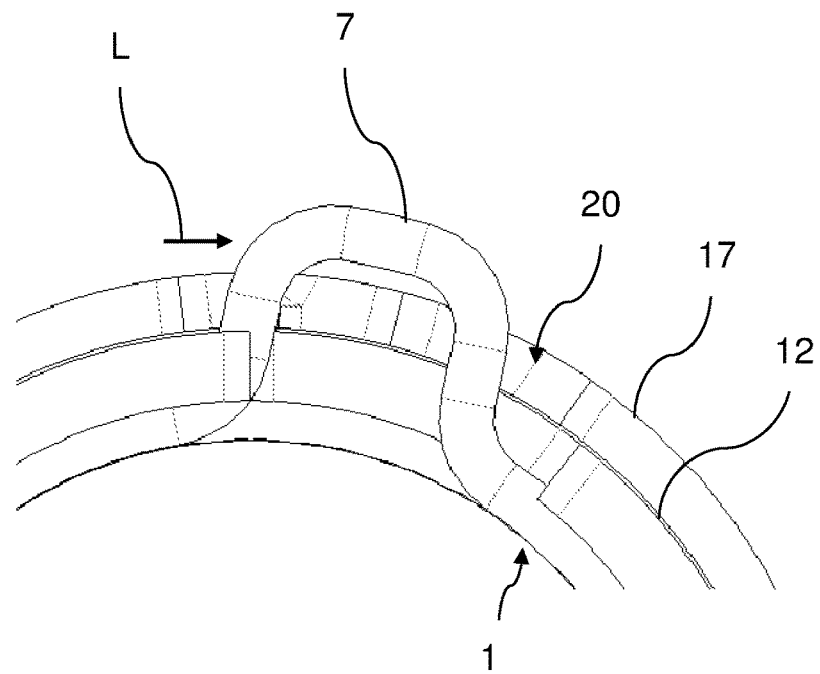
FIG. 5 shows a partial view of the adjusting device with detail of the wrap spring.

FIG. 5 again in detail shows how the U-shaped projection 7 of the wrap spring 1 is suspended in the intermediate ring 17. Particular precautionary measures must be taken for planar introduction of the load L, owing to the large forces involved. A concentrated introduction of the load would overload the wrap spring 1 locally and lead to premature failure. In order to avoid this, the wrap spring 1 is supported in a circumferential direction in the guide sleeve 12, in a three-dimensional bead 20 of the intermediate ring 17. The concentrated introduction of the load is thereby converted into a planar introduction of the load L. At the same time the wrap spring 1 is axially secured via the bead 20.

Figure 6:
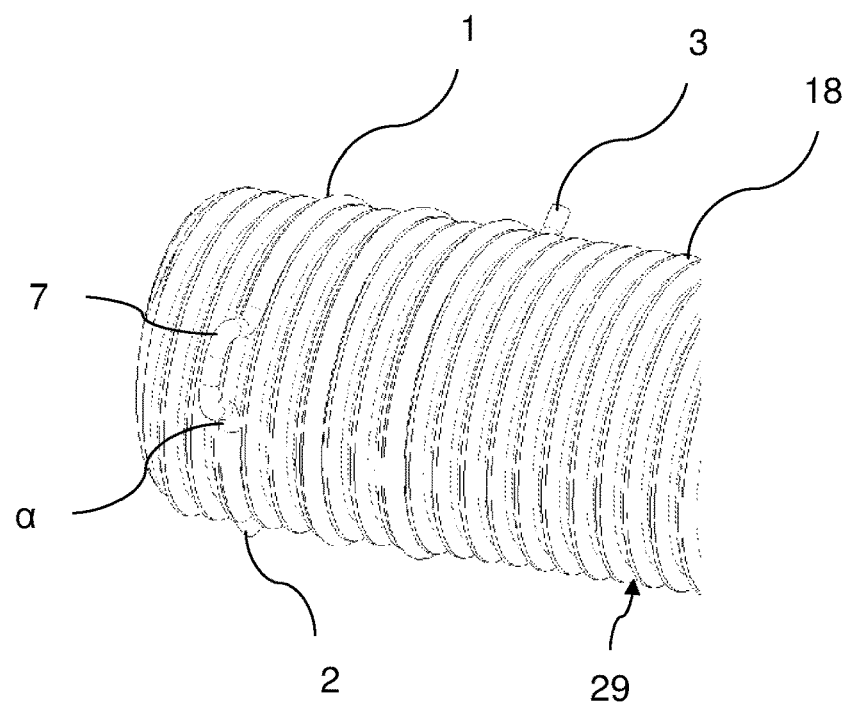
FIG. 6 shows an arrangement of the wrap spring on the adjusting spindle.

The arrangement of the wrap spring 1 with its first wrap spring end 2 and its second wrap spring end 3 on the adjusting spindle 18 is shown in FIG. 6. The adjusting spindle 18 includes the screw thread 29, the wrap spring 1 being arranged directly in the screw thread 29. The first wrap spring end 2 extends, or is continued, in a circumferential direction at an angle α by 90 degrees in the screw thread 29 and serves for fixing the wrap spring 1 on the adjusting spindle 18. The wrap spring 1 is thereby prevented from lifting off at the clamping point. The clamping point can be seen in FIG. 2 and is the area on which the U-shaped projection 7 is supported on the bead 20 of the intermediate ring 17. The coefficient of friction in the screw thread 29 is between 0 and 0.2.

Figure 7:
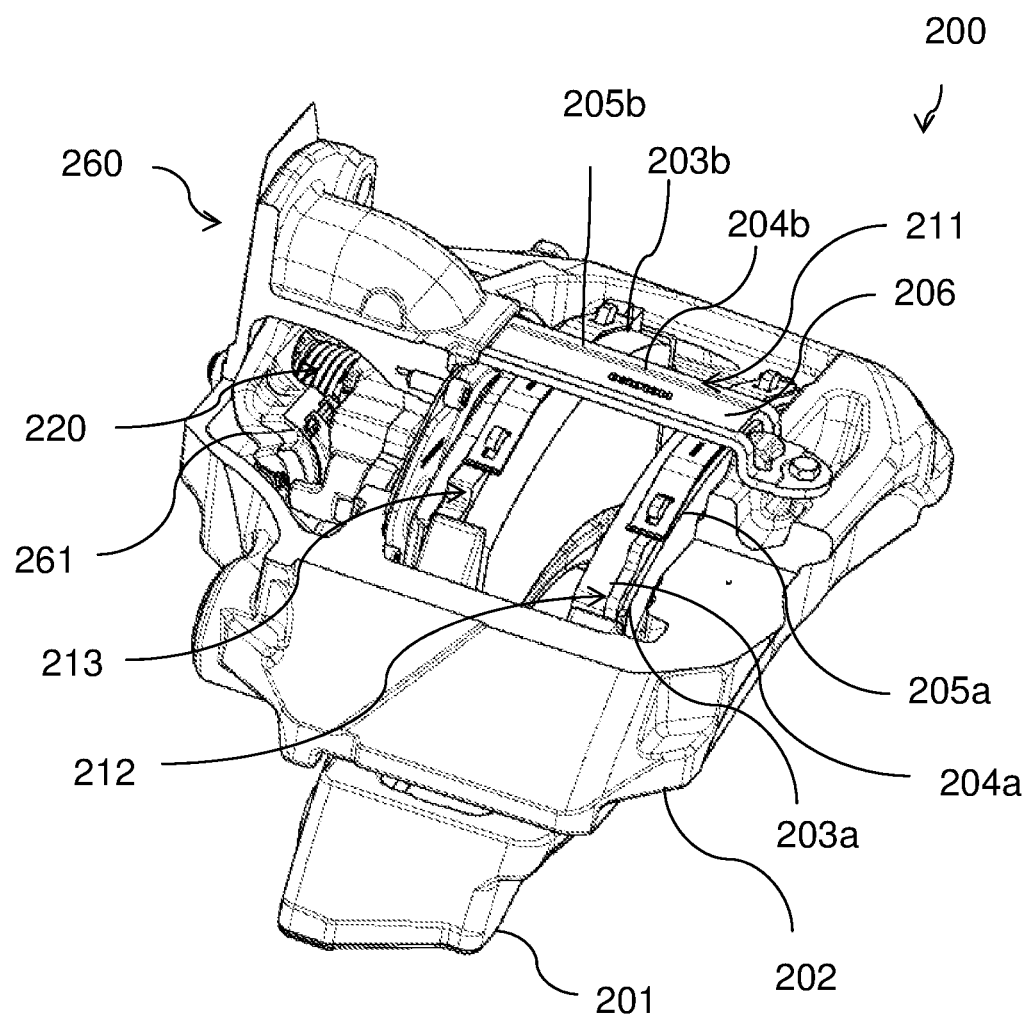
FIG. 7 shows a disk brake with an adjusting device in the fitted state.

FIG. 7 shows a representation of a disk brake 200 for a utility vehicle, with a partial view of a brake application device 260. The disk brake 200 according to FIG. 7 comprises a brake caliper 202 and a brake bracket 201. The brake caliper 202 takes the form of a sliding caliper. The disk brake 200 further comprises a first brake pad support 203a and a second brake pad support 203b for holding the friction pads 204a, 204b. The first brake pad support 203a and the first friction pad 204a is referred to as the first brake pad 212. The second brake pad support 203b and the second friction pad 204b is referred to as the second brake pad 213. A hold-down system 211, comprising a first hold-down spring 205a, a second hold-down spring 205b and a hold-down tie 206, prevents the brake pads 212, 213 from slipping out in a radial direction. The brake application device 260 serves for applying the brake pads 212, 213 to a brake disk (not shown) when the brake is actuated. The brake application device 260 comprises a turning lever 261 for applying the brake pads 212, 213 and an adjusting device 220 for adjusting the clearance between the brake disk and the brake pads 212, 213.

The invention claimed is:

1. An adjusting device (10) for adjusting the wear of brake pads of a disk brake, wherein the adjusting device (10) comprises a guide sleeve (12), in which a wrap spring (1) is arranged, a grooved ring (13) having a groove (22), which encompasses the guide sleeve (12), wherein the grooved ring (13) is coupled to a disk spring (8) via a torsion spring (14), an opening ring (16) encompassing the grooved ring (13), an intermediate ring (17) for overcoming the clearance between the guide sleeve (12) and the wrap spring (1) and a threaded ring (23) having a torsional safeguard (24), wherein the adjusting device (10) is disposed over a rotatable adjusting spindle (18) of the disk brake and the adjusting spindle (18) comprises a screw thread (29), wherein the wrap spring (1) comprises a first wrap spring end (2) and a second wrap spring end (3) with a wrap spring portion (4) arranged between the first wrap spring end (2) and the second wrap spring end (3), and the wrap spring portion (4) extends axially around a wrap spring axis (5) and comprises at least one wrap spring coil (6, 6a), wherein the wrap spring (1) comprises at least one U-shaped projection (7) and is arranged with the U-shaped projection (7) on a bead (20) of the intermediate ring (17).

2. The adjusting device (10) for adjusting the wear of brake pads of a disk brake as claimed in claim 1, wherein the wrap spring (1) is arranged in the screw thread (29) of the adjusting spindle (18).

3. The adjusting device (10) for adjusting the wear of brake pads of a disk brake as claimed in claim 1, wherein the wrap spring (1), during an adjustment process, is supported in a locking direction (SR), opposed to the free-running direction (FR), on a projection (21) of the guide sleeve (12).

4. The adjusting device (10) for adjusting the wear of brake pads of a disk brake as claimed in claim 1, wherein the torsional safeguard (24) of the threaded ring (23), the U-shaped projection (7) of the wrap spring (1), and the groove (22) of the grooved ring (13) are arranged on a common circumferential side of the adjusting spindle (18).

5. The adjusting device (10) for adjusting the wear of brake pads of a disk brake as claimed in claim 4, wherein the torsional safeguard (24) of the threaded ring (23), the U-shaped projection (7) of the wrap spring (1), and the groove (22) of the grooved ring (13) are arranged within an angular segment (25) of 0 degrees to 45 degrees, starting from the wrap spring axis (5).

6. A disk brake for a vehicle comprising:
an adjusting device (10) comprising:
a guide sleeve (12), in which a wrap spring (1) is arranged,
a grooved ring (13) having a groove (22), which encompasses the guide sleeve (12), wherein the grooved ring (13) is coupled to a disk spring (8) via a torsion spring (14),
an opening ring (16) encompassing the grooved ring (13),
an intermediate ring (17) for overcoming the clearance between the guide sleeve (12) and the wrap spring (1) and
a threaded ring (23) having a torsional safeguard (24),
wherein the adjusting device (10) is disposed over a rotatable adjusting spindle (18) of the disk brake and the adjusting spindle (18) comprises a screw thread (29),
wherein the wrap spring (1) comprises a first wrap spring end (2) and a second wrap spring end (3) with a wrap spring portion (4) arranged between the first wrap spring end (2) and the second wrap spring end (3), and the wrap spring portion (4) extends axially around a wrap spring axis (5) and comprises at least one wrap spring coil (6, 6a), wherein the wrap spring (1) comprises at least one U-shaped projection (7) and is arranged with the U-shaped projection (7) on a bead (20) of the intermediate ring (17).

7. The disk brake as claimed in claim 6, wherein the wrap spring (1) is arranged in the screw thread (29) of the adjusting spindle (18).

8. The disk brake as claimed in claim 6, wherein the wrap spring (1), during an adjustment process, is supported in a locking direction (SR), opposed to the free-running direction (FR), on a projection (21) of the guide sleeve (12).

9. The disk brake as claimed in claim 6, wherein the torsional safeguard (24) of the threaded ring (23), the U-shaped projection (7) of the wrap spring (1), and the groove (22) of the grooved ring (13) are arranged on a common circumferential side of the adjusting spindle (18).

10. The disk brake as claimed in claim 6, wherein the torsional safeguard (24) of the threaded ring (23), the U-shaped projection (7) of the wrap spring (1), and the groove (22) of the grooved ring (13) are arranged within an angular segment (25) of 0 degrees to 45 degrees, starting from the wrap spring axis (5).

11. The disk brake as claimed in claim 6, wherein the U-shaped projection (7) is formed from the at least one wrap spring coil (6) between the first wrap spring end (2) and the second wrap spring end (3).

12. The disk brake as claimed in claim 6, wherein the wrap spring 1 extends along an angle (a), as measured from the wrap spring axis (5), from the first wrap spring end (2) to the U-shaped projection (7), in the circumferential direction of the wrap spring (1).

13. The disk brake as claimed in claim 6, wherein the wrap spring (1), from the first wrap spring end (2) to the U-shaped projection (7), extends along an angle (a), as measured from the wrap spring axis (5), by 90 degrees in the circumferential direction of the wrap spring (1).

14. The disk brake as claimed in claim 6, wherein the wrap spring (1) has a circular cross section, a rectangular cross section, or a trapezoidal cross section.

* * * * *